United States Patent [19]

Armstead et al.

[11] Patent Number: 4,515,821

[45] Date of Patent: May 7, 1985

[54] CALCINED SILICAS AND THEIR USE IN BEER CLARIFICATION

[75] Inventors: Brian H. Armstead, Cheshire; James P. Quinn, Merseyside, both of England

[73] Assignee: Internationale Octrooi Maatschappij "Octropa", Rotterdam, Netherlands

[21] Appl. No.: 530,363

[22] Filed: Sep. 8, 1983

[30] Foreign Application Priority Data

Sep. 8, 1982 [GB] United Kingdom ................ 8225651

[51] Int. Cl.$^3$ .............................................. C12H 1/04
[52] U.S. Cl. .................................. 426/330.4; 426/423
[58] Field of Search ............................. 426/423, 330.4

[56] References Cited

FOREIGN PATENT DOCUMENTS

| 938153 | 10/1963 | United Kingdom | 426/423 |
| 981715 | 1/1965 | United Kingdom | 426/423 |
| 1105618 | 3/1968 | United Kingdom | 426/423 |
| 1215928 | 12/1970 | United Kingdom | 426/423 |
| 1279250 | 6/1972 | United Kingdom | 426/423 |
| 1342102 | 12/1973 | United Kingdom | 426/423 |

*Primary Examiner*—Joseph Golian
*Attorney, Agent, or Firm*—Cushman, Darby & Cushman

[57] ABSTRACT

Calcined silica gels have been prepared and found to have improved properties for clarification of beers to prevent or reduce haze formation. The calcined silica gels are defined in terms of their physical properties and also in respect of the surface silanol groupings in terms of the infra-red spectrum peaks.

6 Claims, No Drawings

CALCINED SILICAS AND THEIR USE IN BEER CLARIFICATION

This invention relates to calcined silicas and their use in beer clarification.

More particularly, this invention relates to the preparation of certain calcined silica gels and to their use in the clarification of beers.

Over the years, many proposals have been made concerning the use of silicas in the removal of haze from beer. For example, British Patent Specification No. 938,153 concerns the use of a closely defined silica xerogel in beer clarification. British Patent Specification No. 981,715 covers a rather wider range of silica xerogels, with further limitation concerning their particle size. British Patent Specification No. 1,279,250 discloses the use of a very high surface area xerogel for beer clarification. British Patent Specification No. 1,105,618 concerns the use of a precipitated silicon dioxide in beer clarification and also discloses a process for production of the suitable precipitated silicon dioxide. British Patent Specification No. 1,215,928 discloses the first commercial use of a silica hydrogel in beer clarification and demonstrates certain advantages with respect to the previously-used materials. British Patent Specification No. 1,342,102 deals more generally with the production of a sorption agent-more specifically the production of a sorption agent by treating chrysotile asbestos with acid, washing, drying and grinding the resultant product to yield an absorbent silica/magnesia composition replete in free silanol groups.

However, it has now been found that when these prior art materials are used with certain beers and in certain clarification processes, results are still not entirely satisfactory for the industry which has, as a result of previous developments, raised the standard expected from the haze-removing processes.

For example, when a higgh gravity larger is being treated and it is required that it has a long shelf-life, this improvement cannot always be obtained with the previously-available silica clarifying agents. Similarly, if the beer is to be treated by mixing the silica clarifying agent in a tank and allowing the silica to settle out of the beer, rather than by passing the beer through a filter system coated with the silica clarifying agent, the results have not always been entirely satisfactory to the user. A further fault which has been noted is that with certain beers a post-pasteurisation haze has been observed. This arises during storage, after the beer has been treated with the known clarifying agents and pasteurised, and it has been found by chemical analysis that it is unlikely that this particular haze would be absorbed by the known silica materials.

It has now been found that by selecting particular silica xerogels and subjecting them to a carefully controlled calcination, a form of silica xerogel having a high proportion of single silanol groups on its surface can be produced which is useful in the treatment of certain beers.

Accordingly, this invention provides a process for the treatment of beer, which comprises contacting the beer with a calcined xerogel having a surface area in the range 100 to 450 m$^2$/g, a pore volume of at least 0.66 cc/g and an MPD greater than 100 A and having, in its infra-red spectrum, a peak at 3760 cm$^{-1}$, indicating the presence of a single surface silanol grouping, to produce, in the ratio absorbence at 3760 cm$^{-1}$ over absorbence at 1890 cm$^{-1}$, a number above 2.2, and separating the silica from the beer.

Clearly, the calcination conditions will be critical in relation to the generation of the isolated silanols and to the possible loss of structure of the silica xerogel if it is subjected to excessively high temperatures. It is well known in the silica art that to ensure a heat-resistant structure, the soda content of the silica should be minimal and, in a preferred form of the present invention, the soda content is less than 0.5% by weight Na$_2$O, preferably less than 0.03%. The preferred calcination tenperature for producing the calcined gel provided by this invention is in the range 450° to 750° C., but clearly, with careful control of the duration of the calcination stage higher temperatures can be used.

It should be noted that in British Specification No. 1,342,102 the preferred temperature range for thermal treatment is 240°–270° C. and it specifically states that if the thermal treatment is carried out at excessive temperatures, the absorption capacity of the finished product decreases. It is suggested that higher temperatures are expected to generate siloxane groups by the condensation of the silanol groups and thus reduce the active centres for absorption.

It will be understood that, in view of the rather involved process required for its preparation, it will be more costly to produce than many of the known forms of silica-based beer clarification materials, but in view of its outstanding benefits in connection with difficult beers, it does have a place in the range of materials useful for beer clarification.

During the course of this work, samples of 4 xerogels were taken and dried at 120° C. and calcined at higher temperatures up to 950° C. for a period of 6 hours and the results of this are set out in Table 1 below.

TABLE 1

Surface Properties of Silicas Calcined at Various Temperatures

| | Ignition loss (%)* | Surface Area (m$^2$/g) | Pore Volume (cc/g) | MPD (AU) | Absorbence Ratio |
|---|---|---|---|---|---|
| Xerogel 1: | | | | | |
| Dried at 120° C. | 8.27 | 725 | 0.46 | 25 | 1.26 |
| Calcined 550° C. | 4.68 | 592 | 0.38 | 26 | — |
| Calcined 750° C. | 2.51 | 420 | 0.23 | 22 | — |
| Xerogel 2: | | | | | |
| Dried at 120° C. | 5.06 | 669 | 1.02 | 61 | 2.3 |
| Calcined 550° C. | 3.06 | 409 | 1.10 | 108 | 4.7 |
| Calcined 750° C. | 1.34 | 131 | 0.68 | 208 | 0.63 |
| Calcined 950° C. | 0.18 | 5 | 0.06 | 480 | 0 |
| Xerogel 3: | | | | | |
| Dried at 120° C. | 3.93 | 312 | 1.24 | 159 | 1.91 |
| Calcined 550° C. | 2.95 | 282 | 1.52 | 216 | 3.20 |
| Calcined 750° C. | 1.52 | 216 | 1.41 | 261 | 3.10 |
| Calcined 950° C. | 0.65 | 49 | 0.10 | 82 | 0.49 |
| Xerogel 4: | | | | | |
| Dried at 120° C. | 4.56 | 338 | 1.67 | 198 | 1.91 |
| Calcined 550° C. | 2.64 | 287 | 1.71 | 238 | 3.20 |
| Calcined 750° C. | 1.63 | 262 | 1.78 | 272 | 3.10 |
| Calcined 950° C. | 0.59 | 213 | 0.30 | 56 | 0.49 |
| Aerosil Fume Silica: | 2.29 | 300 | | | 3.15 |

*after predrying at 120° C. - ignition loss was carried out at 1100° C.

The mean pore diameter (MPD) is calculated from the pore volume and surface area data according to the following equation:

$$40,000 \times \frac{PV \text{ cc/g}}{SA \text{ m}^2/\text{g}} = MPD(AU)$$

Samples of the dried and calcined xerogels were taken and used to treat 200 ml aliquots of standard lager and 3½ liter samples of a high gravity lager at a dosage rate of 1 g/l of beer. The contact time was 24 hours and the results of these experiments are set out in Table 2 below.

TABLE 2

SASPL Data for Xerogel Treatment of Standard and High Gravity Lager

| | | Standard Lager SASPL Δ ml. *24 hours | High Gravity Lager SASPL Δ ml. *24 hours |
|---|---|---|---|
| Xerogel 1: | 120° C. | 0.8 | 0.6 |
| | 550° C. | 0.2 | 0.3 |
| | 750° C. | 0.1 | 0.1 |
| | 950° C. | — | — |
| Xerogel 2: | 120° C. | 1.6 | 2.1 |
| | 550° C. | 2.3 | 2.3 |
| | 750° C. | 1.3 | 1.3 |
| | 950° C. | — | 0.1 |
| Xerogel 3: | 120° C. | 1.6 | 1.9 |
| | 550° C. | 2.3 | 2.3 |
| | 750° C. | 2.8 | 2.5 |
| | 950° C. | — | 0.5 |
| Xerogel 4: | 120° C. | 1.9 | 1.7 |
| | 550° C. | 2.7 | 2.1 |
| | 750° C. | 2.6 | 2.3 |
| | 950° C. | — | 0.1 |
| "Hydrogel 40" BP 1215928 - Table 2 | | 1.8 | 1.5 |

*Silica/beer contact time.

A more detailed comparison of the effectiveness of Xerogel 4, calcined at 550° C., and the hydrogel of British Patent Specification No. 1,215,928 was made on further samples of a high gravity lager and the treated beer was bottled and subjected to a heating/cooling cycle to accelerate the formation of haze and, hence, obtain an estimate of the colloidal stability of the beer. The details of this work are set out in Table 3 below.

TABLE 3

Analytical Data for Beer Stabilisation Tests

| Treatment | Dosage Rate (g/l) | SASPL (Δ ml) | Oxidised Polyphenols (Helm Haze Units) | Beer Stability (Weeks to 5 EBC Units) | HRV (Σ sec) |
|---|---|---|---|---|---|
| Control beer | — | — | 172 | 0.8 | 139 |
| Hydrogel | 1.0 | 1.9 | 84 | 3.1 | 129 |
| Xerogel 4/ 550° C. | 0.5 | 1.5 | 88 | 2.8 | 128 |
| Xerogel 4/ 550° C. | 1.0 | 2.2 | 62 | 5.0 | 123 |

Notes on Table 3

(i) SASPL-Saturated Ammonium Sulphate Precipitation Limit
Δml SASPL is the difference between the turbidity limit for an untreated control beer and the limit for the silica treated beers.

(ii) Oxidisable Polyphenols
Polyphenols in beer which induce protein haze are oxidised by hydrogen peroxide and peroxidase; the haze produced (measured with hazemeter calibrated in Helm units) when the oxidised polyphenols react with cinchonine sulphate provides a measure of the oxidisable polyphenols present. Ref: C. C. Thompson, E Forward J Inst Brewing 1969,37.

(iii) Beer Stability
4 bottles of beer from each treatment were cooled at 0° C. for 24 hours and the initial chill haze measured. This was followed by 7 days at 37° C. and 24 hours at 0° C. and chill haze measured again. The cycle was repeated until the chill haze reached 8 EBC units. The store time at 37° C. required to induce chill haze in a beer to a level of 5 EBC units is a measure of the beer stability achieved.

(iv) HRV-Head Retention Values
This is a measurement of foam stability using the Rudin method.

We claim:

1. A process for the treatment of beer, which comprises contacting the beer with a calcined silica xerogel having a surface area in the range 100 to 450 m²/g, a pore volume of at least 0.66 cc/g and an MPD greater than 100 A and having, in its infra-red spectrum, a peak at 3760 cm$^{-1}$, indicating the presence of single surface silanol groupings, to produce, in the ratio absorbence at 3760 cm$^{-1}$ over absorbence at 1890 cm$^{-1}$, a number above 2.2, the amount of silica being effective to clarify the beer, and separating the silica from the beer.

2. A process as claimed in claim 1, in which the particle size of the calcined silica xerogel is in the range 5 to 30 microns.

3. A process as claimed in claim 1, in whcih the soda content of the calcined silica xerogel is less than 0.5% by weight NA$_2$O.

4. A process as claimed in claim 3 in which the soda content is less than 0.03% by weight Na$_2$O.

5. A process as claimed in claim 1, in which the calcination temperature is in the range of 450°–750° C.

6. A process as claimed in claim 1 in which the ratio absorbence of 3760 cm$^{-1}$ over absorbence at 1890 cm$^{-1}$ is at number greater than 3.0.

* * * * *